Dec. 4, 1962  A. SMITH ET AL  3,066,745
DEBANKER
Filed April 30, 1959

INVENTORS
ALEXANDER SMITH
BURTON D. BAGGS, JR.

BY
*Hydrus Dowell*
ATTORNEY

United States Patent Office 3,066,745
Patented Dec. 4, 1962

3,066,745
DEBANKER
Alexander Smith, P.O. Box 1460, and Burton D. Baggs, Jr., 2801 Park Ave., both of Sanford, Fla.
Filed Apr. 30, 1959, Ser. No. 810,055
3 Claims. (Cl. 172—118)

This invention relates to the cultivation of the soil including the treatment and movement of earth in the planting and tilling thereof and to the care for and the protection of plant life as well as to the equipment employed in such operations.

The invention is concerned specifically with cultivation which includes debanking, or the removal of earth from around the base of young trees and other plants which was put there to protect against the cold or for other reasons and which concentration of earth it is desired to level or remove after the cold or its other use has abated or become unnecessary and to apparatus and equipment by which the removal or leveling of the earth is accomplished.

It has been customary to provide a substantial hill or mound of earth around small citrus trees to protect them from cold weather and later to level or remove the earth to permit the growth and development of the trees with fertilizer added to stimulate such growth. The debanking or leveling of the earth has been done by hand, by means of plows or other farm implements, involving substantial time and expense in the performance of the same, and likewise the disking or use of a cultivator has been an independent operation.

It is an object of the invention to provide apparatus or equipment for debanking or removing a mound of earth from around the base of a tree and for spreading the earth in a manner that it can be integrated with the surrounding earth by a cultivator or the like.

Another object of the invention is to provide a debanker or earth leveling structure of any desired character such as, for example, a rotary brush which can be applied to a tractor, under-tree hoe, or other structure and by means of which the earth leveling or debanking operation can be accomplished simultaneously with or as a part of other necessary operations.

A further object of the invention is to provide a device for cutting grass and other growth, loosening and stirring the soil, as well as a device for debanking or leveling a mound of earth around the base of a plant and for mixing it with the remaining soil all in one operation.

A further object of the invention is to provide an under-tree mower, cultivator, and earth leveler or debanker mounted on a tractor or other vehicle and usable for performing the respective services at one and the same time.

Figure 1:
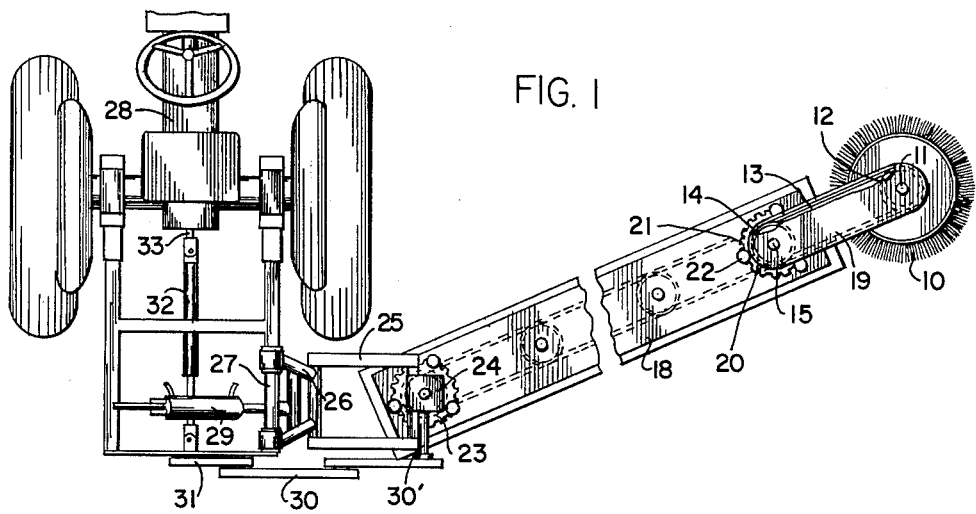
Figure 2:
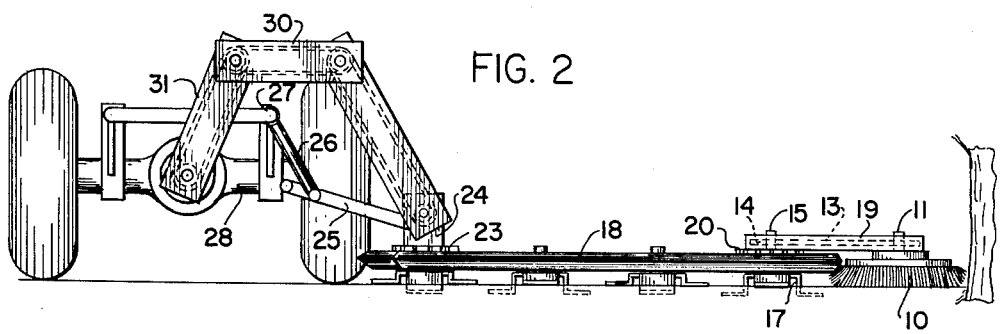

Other objects and advantages of the invention will be apparent from the following description taken in conjunction with the accompanying drawings wherein:

FIG. 1 is a top plan view illustrating one application of the invention;

FIG. 2, a rear elevation thereof; and

Figure 3:
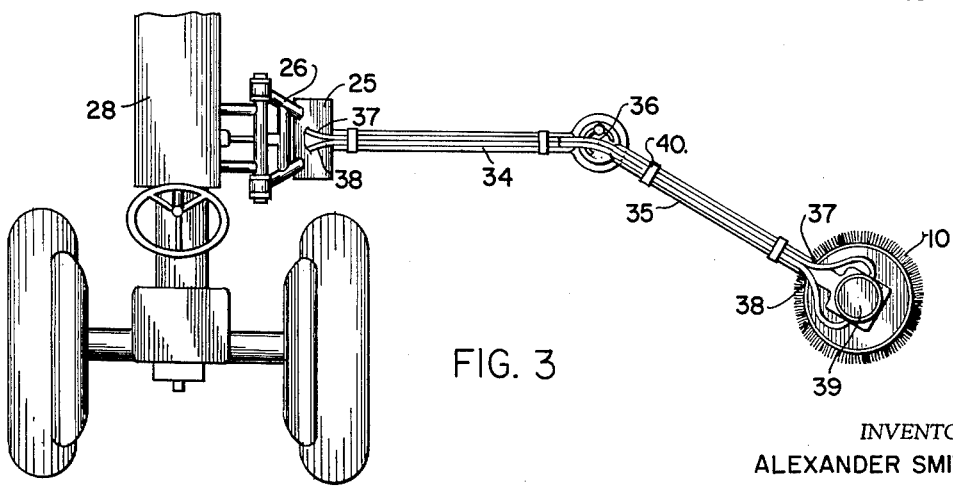

FIG. 3, a top plan view of a modified form of the invention.

Briefly stated, the invention is a combination machine including a mower and under-tree cultivator for application to a conventional tractor and a debanker, the cultivator including an elongated cutter bar housing which can be adjusted as to height, angularity, and lateral position, and with the earth leveling or debanking structure by which earth may be removed from around a small tree or other plant and as the earth is leveled or removed, it is worked into the soil, it being possible to operate where the soil contains growth.

This application is a continuation in part of my prior application, Serial No. 633,871, filed January 14, 1957, and now Patent No. 2,974,469, granted March 14, 1961. Reference may be had to said patent for a fuller disclosure of details concerning structures illustrated in this application.

With continued reference to the drawing, a debanker such as a rotary brush 10 may be mounted on a shaft 11 carrying a sprocket 12 fixed thereto and driven, for example, by a chain 13 from a sprocket 14 on a shaft 15 extended from within a cutter bar housing 18, a housing 19 being provided for enclosing sprockets 12 and 14 and chain 13.

Means is provided for adjusting the angularity of the supporting housing 19 of the chain 13 relative to the cutter bar, such means being in the form of a mounting member 20, having teeth 21 between which anchoring bolts 22 are disposed, such bolts engaging the cutter bar 18 which is like that disclosed in copending application, Serial No. 633,871 filed January 14, 1957, now Patent 2,974,469 and is annularly adjustable about a second mounting member 23 attached to a gear box or transmission unit 24 carried by extensible toggle frames 25 and 26 attached to a shaft 27 of tractor 28 and manipulatable by a hydraulic cylinder 29 to move the cutter bar laterally toward and from the tractor while it follows the contour of the terrain, the transmission 24 receiving power through a jackknife multiple chain and sprocket drive 30, 30' and a chain drive transmission 31 through an extensible connection 32 from the power take-off 33 of the tractor.

As shown in FIGS. 1 and 2 and also as shown in said Patent 2,974,469, shaft 27 extends longitudinally of the tractor 28 and is part of a rigid H-frame which is fixed to the axle housings of the tractor. Likewise, it can be seen that frame 26 is pivoted to swing on shaft 27, that frame 25 is pivoted to the outer end of frame 26, and that gear box 23 with the cutter bar 18 is pivotally connected to the outer end of frame 25.

If desired, the cutter bar 18 may be omitted and the debanker may be mounted directly on the frame 25 of the projection and retraction frame mechanisms 25 and 26 as illustrated in FIG. 3. In such a modified structure a pair of mounting bars 34 and 35 are pivotally connected and with the arm 35 mounted to swing approximately 90 degrees relative to the arm 34, a pivot hinge 36 being provided for this purpose and with a hydraulic or other driving cables or connections 37 and 38, to the gear box 39, such driving cables or connections being attached by clamps 40 to the arms 34 and 35. The gear box 39 drives the shaft 11 of the brush 10.

It will be obvious to those skilled in the art that various changes may be made in the invention without departing from the spirit and scope thereof and therefore the invention is not limited by that which is illustrated in the drawing and described in the specification but only as indicated in the accompanying claims.

What is claimed is:

1. A debanking apparatus comprising in combination an agricultural tractor having a power take-off, an elongated cutter bar, a plurality of cutting elements spaced along said cutter bar including an inner cutting element adjacent to the tractor and an outer cutting element remote from the tractor, a rotary driven means for rotating said inner cutting element and power transmitting means for driving the rest of said cutting elements from said rotary driven means, means drivingly connecting said power take-off with said rotary driven means, means for supporting said cutter bar to extend laterally of said tractor with said cutting elements in a plane adjacent to the ground level, said supporting means comprising a stationary frame fixed to said tractor, an extensible frame pivoted at one end to said stationary frame on an axis parallel to the longitudinal axis of the tractor, pivot means at the other end of said extensible frame for pivotally mounting said cutter bar so that it may rise and fall to accommodate itself to the contour of the ground, a rotary brush having bristles for engaging the earth, a shaft on which said brush is mounted for rotation, an arm for rigidly supporting said brush at the outer end of said cutter bar, means for rotating said brush shaft from the driving means of said outer cutting element and means mounted on said tractor for projecting and retracting said extensible frame as desired, whereby the brush directs soil forwardly of the cutter bar so that the cutter bar will cultivate and work said soil into the ground traversed by the cutter bar.

2. The apparatus of claim 1, wherein the means for drivingly connecting said power take-off with said rotary driven means is mounted on and carried by an extensible connection which comprises an elongated guard housing pivoted to said stationary frame on an axis concentric with the power take-off, a second elongated guard housing pivoted to said rotary driven means, and a third elongated guard housing pivoted at one end to said first guard housing and pivoted at its other end to said second guard housing.

3. The apparatus of claim 1, in which means is provided for adjusting the angular position of the brush arm with respect to the cutter bar.

References Cited in the file of this patent

UNITED STATES PATENTS

| | | |
|---|---|---|
| 1,668,850 | Larsh | May 8, 1928 |
| 2,206,283 | Jacobs | July 2, 1940 |
| 2,558,623 | Mott | June 26, 1951 |
| 2,684,495 | Litkenhous | July 27, 1954 |
| 2,771,829 | Sahlbom | Nov. 27, 1956 |
| 2,777,272 | Smith | Jan. 15, 1957 |
| 2,805,612 | Beard | Sept. 10, 1957 |
| 2,871,804 | Pounds | Feb. 3, 1959 |
| 2,906,080 | Light | Sept. 29, 1959 |